United States Patent [19]

Hinner

[11] Patent Number: 5,143,203

[45] Date of Patent: Sep. 1, 1992

[54] GRANULAR MATERIAL TRANSFER APPARATUS

[75] Inventor: Pat S. Hinner, Merrill, Wis.

[73] Assignee: Merrill Iron & Steel, Inc., Merrill, Wis.

[21] Appl. No.: 699,740

[22] Filed: May 14, 1991

[51] Int. Cl.[5] .............................. B65G 17/36
[52] U.S. Cl. .............................. 198/708; 198/711; 198/713
[58] Field of Search ............... 198/708, 711, 713, 714

[56] References Cited

U.S. PATENT DOCUMENTS

| | | | |
|---|---|---|---|
| 917,546 | 4/1909 | Commandoer | 198/713 |
| 972,317 | 10/1910 | Ball | 198/711 |
| 2,753,979 | 7/1956 | Blackman et al. | 198/708 |
| 2,973,854 | 3/1961 | Roloson | 198/713 |
| 4,799,584 | 1/1989 | Hartsuiker et al. | 198/711 |

FOREIGN PATENT DOCUMENTS 682423  8/1979  U.S.S.R. .............. 198/711

*Primary Examiner*—Joseph E. Valenza
*Attorney, Agent, or Firm*—Lawrence M. Nawrocki

[57] ABSTRACT

A conveyor/elevator for moving bulk granular materials from a first location, at a designated height, to a second location, at an elevated height. The apparatus includes an endless conveyor web which is tensioned and has oppositely facing elevating and return runs. A plurality of carriages or buckets are attached to the conveyor web, and, as the web is driven, the granular material is introduced into the buckets at the first location proximate the bottom of the elevating run. The carriages or buckets into which the material has been introduced move, thereafter, upwardly along the elevating run and over the apogee of the structure. Each bucket has a floor which, when the bucket is moving along an elevating run, extends, at an acute angle, upwardly and away from the conveyor web. When the bucket moves along the return run, the floor extends, at the same angle, downwardly and away from the conveyor web. As one particular bucket passes from the elevating run to the return run, therefore, as it passes over the apogee of the conveyor system and material transported therein is emptied, the floor of a bucket immediately forward of the carriage will serve as a deflector to channel the materials being emptied into a receptacle proximate the upper end of the return run.

6 Claims, 5 Drawing Sheets

GRANULAR MATERIAL TRANSFER APPARATUS

TECHNICAL FIELD

The present invention deals broadly with a technology related to transfer of bulk materials from one location to another. More specifically, however, the invention deals with the transfer of granular materials vertically upward. The focus of the invention is a structure wherein granular materials are conveyed and elevated in a manner to minimize breaking and cracking of the product.

BACKGROUND OF THE INVENTION

In industry, it is necessary to transfer bulk materials from one location to another. This can be occasioned because of a need to move the product from one location to another for subsequent processing. Alternatively, a storage cite may be located at some distance from a processing cite, and transfer must be effected to move the product to the storage cite.

Frequently, transfer of the product is purely in a horizontal direction or along an axis that is inclined at only a slight angle from the horizontal. In such a case, horizontal conveyor belts have been employed to effect movement. In other cases, however, transfer must be made in a vertical direction. Frequently, the material must be raised from one height to an elevated location. Typically, apparatus employed to effect such vertical movement must be more sophisticated than that used in accomplishing horizontal transfer.

The situation is aggravated when the bulk material is granular in nature. The transfer of such products introduces unique problems. For example, because of the small size of particles, clogging of machine components can result. Inefficient operation and down-time do, therefore, often result.

Various types of elevators for granular materials have been developed. One typical mechanism employs a pair of endless, parallel drive chains mounting spaced buckets along the length thereof. In some apparatus, these buckets can swing freely about a generally horizontal axis with respect to which a bucket is mounted to the drive chains. Filling of the buckets results in much of the product falling into a basin at the bottom of an elevator.

More significantly, however, this type of apparatus occasions breaking or cracking of the product granules as the buckets are emptied. The drive chains run over upper and lower sprockets, and the elevator is intended to deposit the granular material in the buckets into a receptacle immediately after a bucket passes over the apogee of the elevator. Because of the nature of mounting of a bucket, the drive mechanism effects rapid movement so that, as a bucket passes over the apogee, it will be centrifugally inverted to permit emptying. The high speed of operation, however, while it affords advantages as far as emptying, frequently results in damage to the product. As previously indicated, undesirable breaking or cracking of the material can, and does, occur.

It is to these and other problems and dictates of the prior art that the present invention is directed. It is an improved conveyor/elevator device for transferring granular materials from one location to an elevated location.

SUMMARY OF THE INVENTION

The present invention is a system for transporting bulk granular material from a first location to a second location at a height elevated with respect to the height of the first location. The system includes a continuous conveyor and means by which the continuous conveyor is tensioned. Oppositely facing elevating and return runs of the tensioned conveyor are driven in reciprocal non-horizontal directions. The conveyor carries a plurality of material transporting carriages. Each carriage includes a floor which, when the particular carriage is moving along the elevating run, extends at an acute angle, upwardly and away from the conveyor. When that same carriage moves along the return run, the floor thereof extends, at the same acute angle, downwardly and away from the conveyor. As a result, as one carriage passes from the elevating run to the return run as it passes over the apogee of the conveyor system, material transported in that carriage is emptied and deflected into a receptacle by the floor of another carriage positioned immediately forwardly relative to the carriage being emptied.

In a preferred structure of the invention, the system is oriented so that the elevating and return runs are disposed substantially vertically. In that embodiment, the conveyor comprises a continuous web rather than mere sprocket-driven chains. It is envisioned that the continuous web would be made of a high-strength rubber belting material.

In the preferred embodiment, each carriage includes side baffles which extend rearwardly, with respect to a direction of movement of the conveyor, from the floor of the carriage. The baffles, together with the floor of the carriage of which they are a part, define, when the particular carriage passes from the elevating run to the return run, a chute down which granular material in a rearwardly adjacent carriage passes into the receptacle at the elevated location.

In the preferred embodiment also, carriages are mounted to the rubber belt conveyor by appropriate means such as nut/bolt combinations. Mounting is effected to space the carriages closely with respect to one another. Consequently, as the carriages pass over the elevating run and return run, respectively, they will be nested together.

The present invention is thus an improved system for transporting bulk granular materials from one location to an elevated location. More specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figure 1:
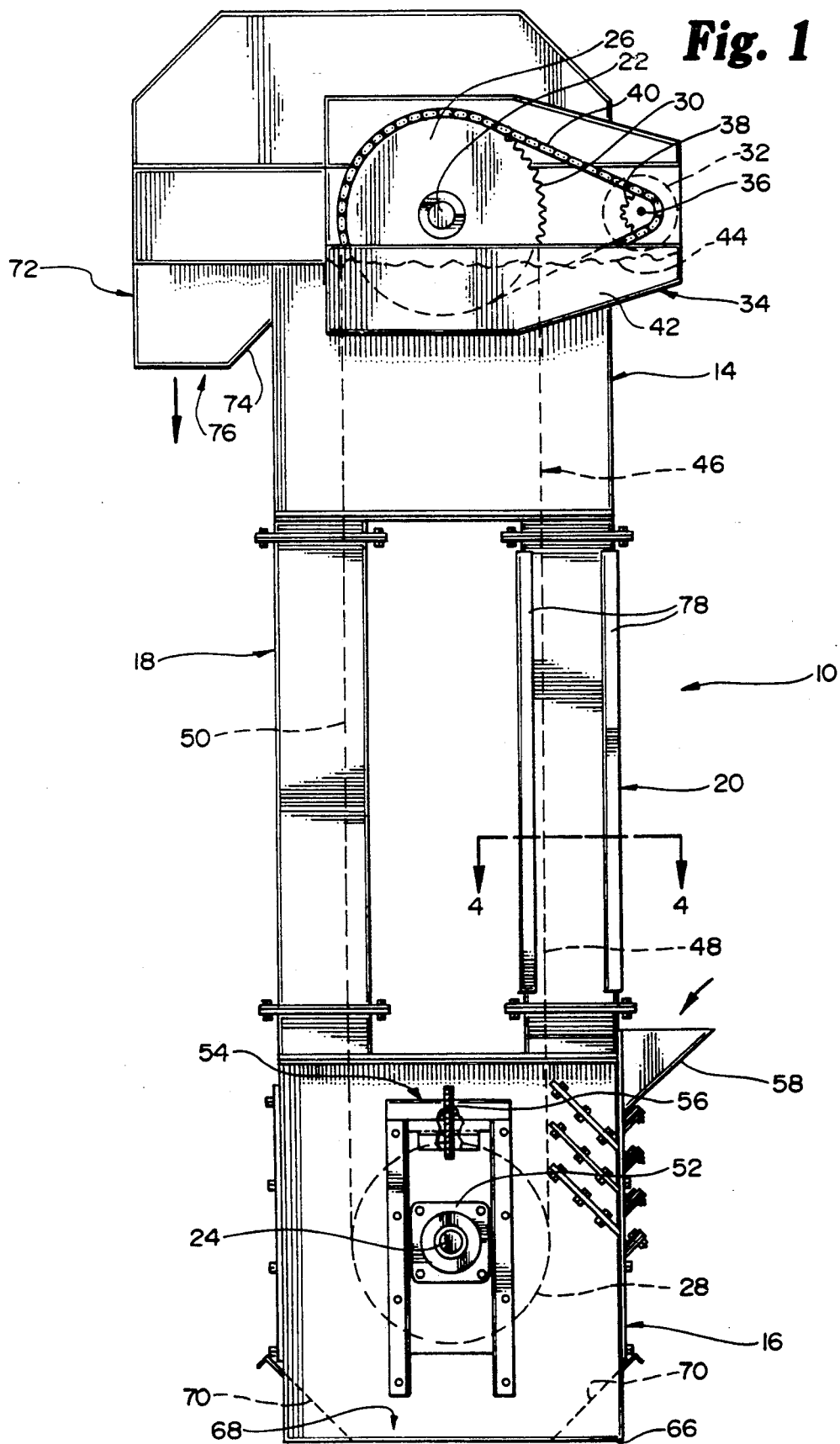
FIG. 1 is a left side elevational view of an elevator system employing the present invention.
Figure 2:
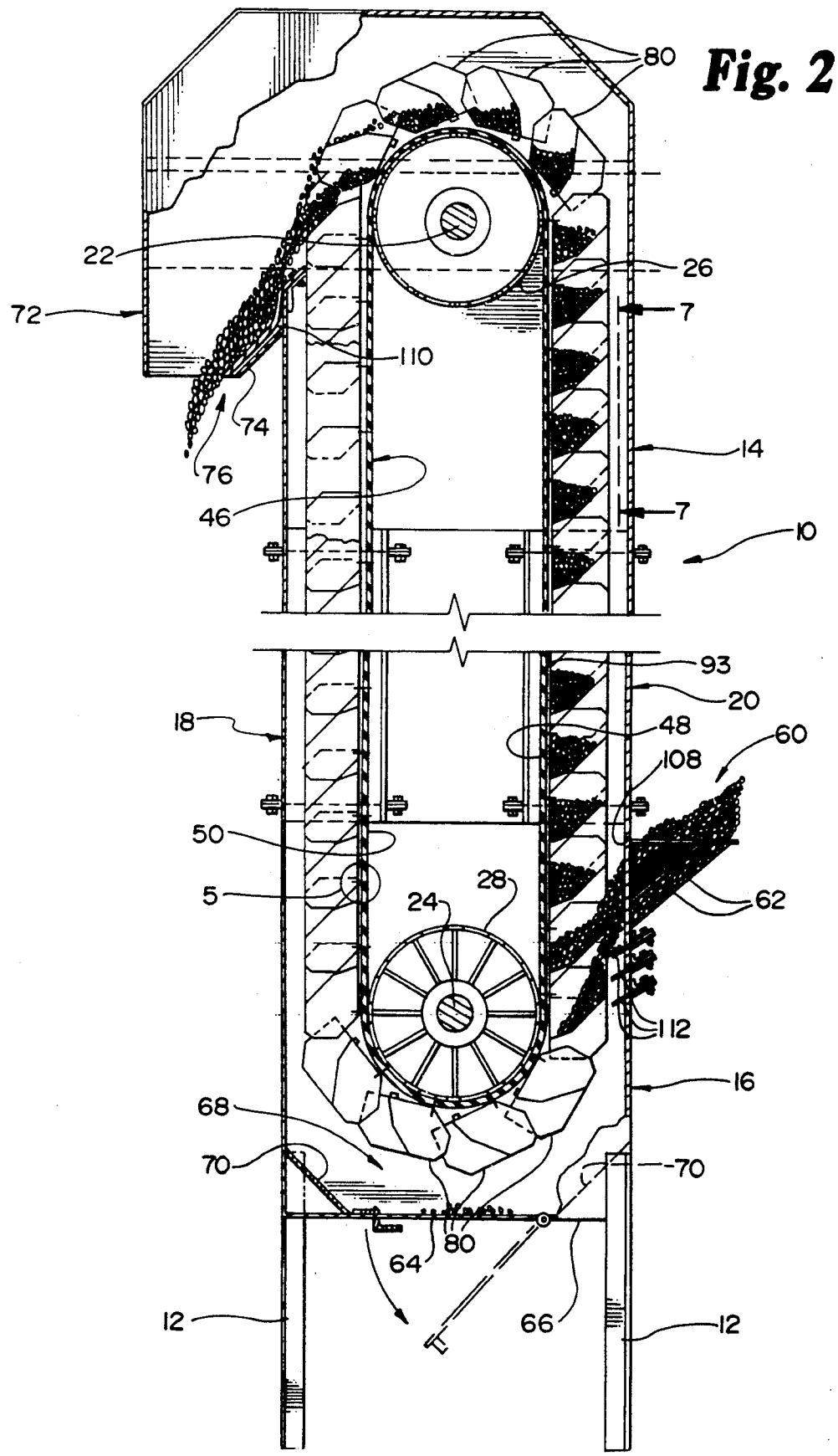
FIG. 2 is a left side elevational view of the system as mounted on legs, and having some parts cut away.
Figure 4:
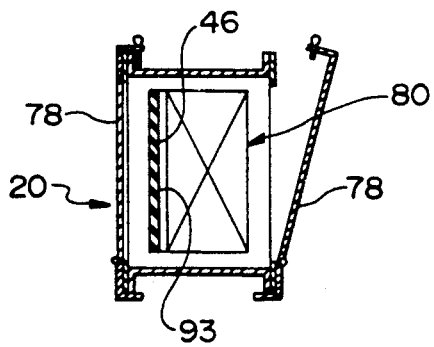
FIG. 4 is a top plan sectional detail view taken generally along line 4—4 of FIG. 1.

Referring now to the drawings wherein like reference numerals denote like elements throughout the several views, FIG. 1 illustrates a housing 10 of a type in which the present invention would typically reside. FIG. 2 shows the housing 10 as being supported by a plurality of legs 12. It will be understood, however, that support of the housing 10 could be maintained in any appropriate fashion including securing the housing 10 to a wall by appropriate brackets (not shown).

The housing 10, as seen in the figures, is divided into upper and lower portions 14, 16, the upper and lower portions 14, 16 being interconnected by a pair of conveyor tubes 18, 20. An axle 22, 24 mounting a spool 26, 28 is journalled within each housing portion 14, 16. The upper spool 26 has, coaxial therewith, a sprocket 30, and the sprocket 30 is driven in rotational motion by a motor 32 displaced rearwardly from the housing 10, the motor 32 being received, together with the sprocket 30 coaxial with the upper spool 26, within a cowl 34 mounted to the side of the housing 10 upper portion 14. The motor 32 has an axle 36 which drives a small sprocket 38, and a tensioned endless chain 40 is run over the small sprocket 38 and the sprocket 30 which is coaxial with the upper spool 26. Rotational motion of the motor 32 can, thereby, be translated into rotation of the upper spool 26.

FIG. 1 illustrates an oil tub 42 which, typically, would be employed with the transmission mechanism. An oil level 44 would be maintained within the tub 42 in order to keep the sprockets 30, 38 and chain 40 well lubricated.

FIGS. 1 and 2 show an endless conveyor 46 as extending over the upper and lower spools 26, 28. This conveyor 46 would, typically, take the form of an endless web. In the preferred embodiment, the conveyor 46, it is intended, is made of high-strength rubber belting material.

As shown in FIGS. 1 and 2, rotation of the drive spool (that is the upper spool 26) is in a counter-clockwise direction. Consequently, the rightmost run 48 of the conveyor 46 moves upwardly through the right conveyor tube 20, and the leftmost run 50 of the conveyor 46 moves downwardly through the left conveyor tube 18.

It is, of course, intended that a tension be maintained on the conveyor web 46, and, as best seen in FIG. 1, the lower spool 28 can be adjustable vertically in order to vary the tension on the conveyor 46. The axle 24 to which the lower spool 28 is mounted can be journalled in plates 52 which are moveable relative to a strut support system 54 fixed within the lower housing portion 16. Varying of tension on the conveyor 46 can be effected by rotation of a threaded shaft 56 by which the assembly of the lower spool 28 and the journal plates 52 is suspended. It will be understood, however, that any appropriate tensioning means could be employed.

FIGS. 1 and 2 also illustrate a charging funnel 58 by means of which bulk granular material 60 can be fed into the housing 10. FIG. 2 shows multiple coursers 62 for directing the material 60.

FIG. 2 shows a door 64 as being provided in the floor 66 of the housing lower portion 16. As will be able to be seen hereinafter, small amounts of the granular material introduced into the housing 10 to be transferred upwardly by the conveyor 46 can fall into a collection hopper 68, defined by sloped walls 70, at the bottom of the housing lower portion 16. The door 64 can be swung downwardly to remove this residual material.

FIGS. 1 and 2 also illustrate a shroud 72 which covers a section of the upper portion 14 of the housing 10. The shroud 72 defines a receptacle 74 which leads to a collection location for the bulk material 60 having been elevated by the conveyor 46. The figures show a discharge mouth 76 through which the elevated material would pass.

As seen in FIG. 1 access doors 78 can be provided to one or both of the conveyor tubes 18, 20. FIG. 1, however, shows such doors 78 as being provided only for the tube 20 through which the elevating run 48 of the conveyor 46 passes.

Figure 3:
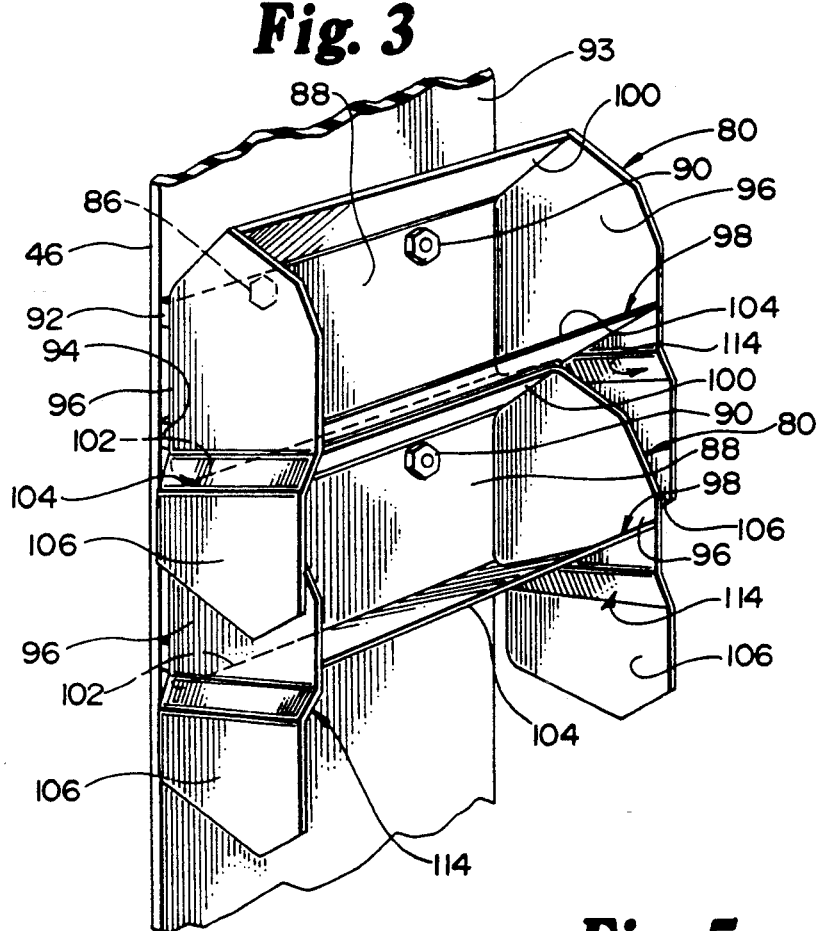
FIG. 3 is a fragmentary perspective view of a part of the conveyor of the invention illustrating a pair of buckets attached thereto.
Figure 5:
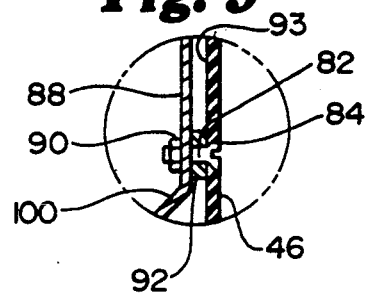
FIG. 5 is an enlarged detail view from the area encircled at 5 in FIG. 2.

As best seen FIG. 2, the conveyor 46 is provided with a plurality of carriages or buckets 80 along the length thereof. The buckets 80, typically, would have a width substantially the same as the conveyor belt 46. As best seen in FIGS. 3 and 5, nut/bolt arrangements can be employed for securing the buckets 80 to the conveyor 46. As seen in FIG. 3, a pair of nut/bolt arrangements, the bolts 82 of which would be passed through horizontally-aligned holes 84 in the belt 46 registered with corresponding apertures 86 in the upper portion of the back wall 88 of a bucket 80, are intended. FIG. 5 illustrates the securing means for a bucket 80 as employed for a bucket on the return run 50 of the conveyor 46. That is, the bucket 80 illustrated in FIG. 5 is inverted. That figure illustrates a flathead bolt 82 inserted through the cooperating hole 84 and registered aperture 86 with the nut 90 being secured from the bucket side. FIG. 5 also illustrates a spacer bar 92 which renders the bucket 80 at some distance from the surface 93 of the conveyor 46. As the result of employment of such a bar 92, minimization of built-up of granular material 60 will be achieved.

It will be understood that, if desired, a second spacer bar 94 could be secured to the bucket 80 proximate a lower edge of the back wall 88 thereof to engage the conveyor surface 93. The bucket 80 would not, however, at the location of this lower bar 94 be secured to the surface 93. As a result, as each bucket 80 passes over the apogee of the conveyor assembly (that is, over the curved surface defined by the upper spool 14), the lower bar 94 will lift off the conveyor surface 93.

Figure 7:
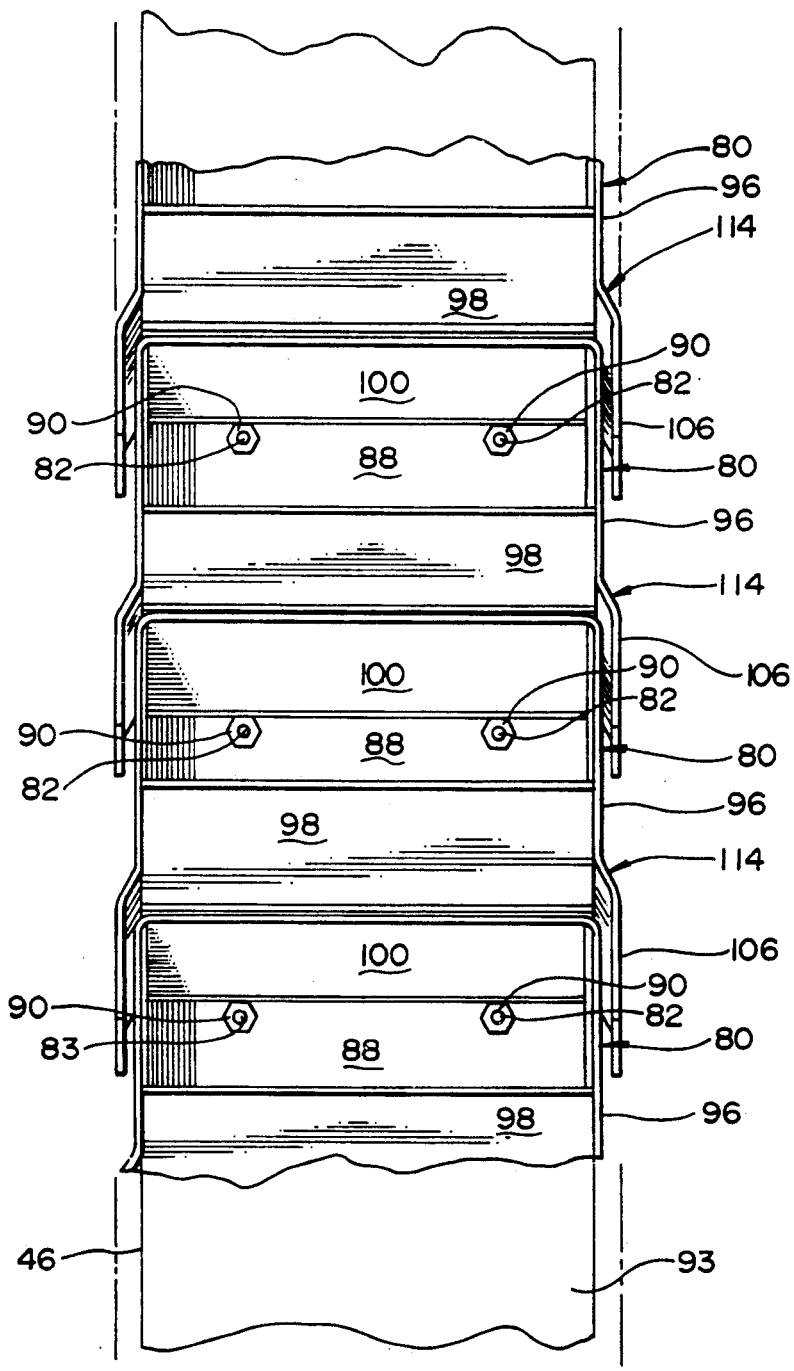
FIG. 7 is a fragmentary rear sectional view taken generally along line 7—7 in FIG. 2.

FIGS. 3 and 7 best illustrate the construction of a bucket 80. The bucket 80 includes, as previously discussed, a back wall 88 which is closely proximate the surface 93 of the conveyor 46. Further, the bucket is illustrated as having a pair of side walls 96 extending upwardly from the floor 98 of the bucket 80 to a roof 100 thereof.

Figure 6:
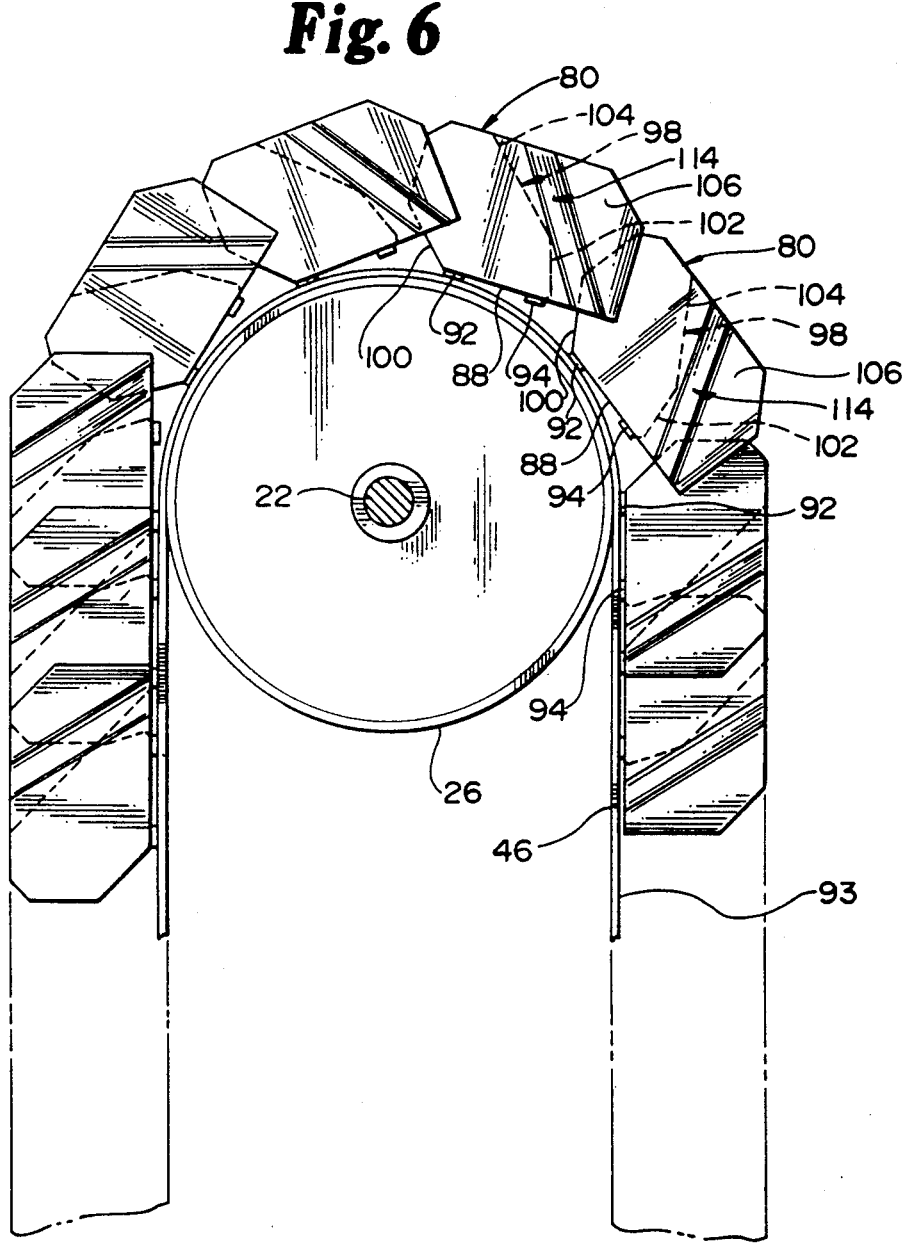
FIG. 6 is a fragmentary detail view of an upper portion of the elevator structure including a drive spool and a plurality of buckets attached to the conveyor.

As best seen in FIGS. 3 and 6, one embodiment of the invention employs a dual panel floor 98. A first panel 102 most closely proximate the back wall 88 of the bucket 80 extends, when the particular bucket 80 is in the elevating run 48 of the conveyor 46, upwardly and away from the conveyor 46 at an acute angle. The second or outer panel 104 of the floor 98 extends from the first panel 102 upwardly and away from the conveyor 46 at a more acute angle. Because of this construction, the roof 100 of an immediately lower bucket in the elevating run 48 can be permitted to be received within the recess defined by the panel 102 of the floor 98 immediately adjacent the back wall 88 of the bucket 80. The roof 100 of the lower bucket and the outer panel 104 of the floor 98 of upper bucket can, therefore, when the two adjacent buckets are in the elevating run 48 of the conveyor 46, be substantially co-planar.

Each bucket 80 is also illustrated as having a pair of side baffles 106, each side baffle 106 extending downwardly, with respect to the elevating run 48 of the conveyor 46, from a corresponding side wall 96 of the bucket 80. The baffle 106 is, however, stepped outwardly from the side wall 96 from which it depends. This is so in order that the next adjacent bucket be able to be accommodated between the baffles 106.

As seen in FIG. 3, the baffles 106 of one bucket 80, in a sense, form extensions of the side walls 96 of the immediately adjacent lower bucket, from the perspective of two buckets in the elevating run 48. As a result, as bulk granular material 60 is introduced into the buckets 80 through an inlet 108 in the rear of the lower housing portion 16, scattering of the material will be inhibited.

More significantly, however, the baffles 106 serve an important function when the buckets 80 are being emptied. As best seen in FIGS. 2, loaded buckets 80 passing through the elevating run 48 of the conveyor 46 eventually arise to the apogee of the elevator system. As the buckets 80 begin to pass over the upper spool 26, they become tilted more and more so that the bulk material 60 therein tends to shift along the back wall 88 and to the roof 100 thereof. Again, as shown in FIG. 2, the lower end of the bucket 80 will tend to migrate away from the conveyor surface 93 in view of the curvature of the spool 26 and the nonattachment of the lower bar 94 to the conveyor 46. The bucket 80 will enter the return run 50 and become more and more inverted. As this occurs, the bulk material 60 shifts until it is almost exclusively supported by the roof 100 of the bucket 80. Eventually, the material in the bucket 80 will begin to spill out thereof along the surface of the roof 100. It will be able to be seen, in view of this disclosure, that a roof 100 would, typically, be employed so that the bulk material 60 would not immediately fall behind a forwardly adjacent bucket while the unattached lower end of that adjacent bucket is spaced from the conveyor surface 93.

As the material in a bucket 80 spills out of the bucket from the roof surface thereof, it will engage the floor 98 of the bucket ahead of the bucket from which the material has spilled. The face of the floor 98 of that bucket 80 engaged by the material as it spills out, however, is the bottom or outwardly surface of the floor 98. This surface will, thereby, deflect the material outwardly and into the receptacle 74. As this occurs, the baffles 106 in combination with the floor 98 will define a chute down which the material will be directed. Typically, a blade 110, the edge of which would be closely proximate the outer extremities of the buckets 80 in their return run 50, would be provided to direct as great a percentage as possible of the elevated bulk material 60 into the receptacle 74.

At the input end at which filling of the buckets 80 is performed, the coursers 62 direct the material fed into the charging funnel 58 through an opening 108 and into the interior of the lower housing portion 16. It is intended that, to function optimally, the system be provided with a plurality of dressing blades 112 to channel as large an amount as possible of the material 60 fed into the charge funnel 58 into the buckets 80. As previously pointed out, however, any material not actually entering a bucket 80 will be able to fall into the hopper 68 at the bottom of the lower housing portion 16 and can be removed therefrom through the access door 64 provided in the floor 66.

FIG. 3 illustrates an angled step, as at 114, spacing the side baffles 106 from their respective side walls 96. The angle of that step with respect to the conveyor surface 93 is substantially the same as the angle between the conveyor surface 93 and the first floor panel 102 (that is, the panel most closely proximate the conveyor surface 93). FIG. 6, however, illustrates an angle relative to the conveyor surface 93, of the step which is not parallel to that of the first floor panel 102. The specific angle of the step relative to the conveyor surface 93 is not critical, although it is important that it be sufficient, and at a location, to accommodate nesting of adjacent buckets 80.

If desired, the lower spool 28 can be self-cleaning in nature. That is, the outer surface, while maintaining a cylindrical form, can be porous so that any granular material 60 dropping through the housing 10 can pass therethrough. As a result, plugging and clogging can be minimized, and efficient operation of the system can be maximized.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for transporting bulk granular material from a source at one height to a receptacle at an elevated height, comprising:
   (a) a continuous web conveyor belt; and
   (b) a plurality of material transporting carriages carried by said conveyor belt and spaced at defined intervals therealong, each carriage including a back wall, a floor having a first panel which, when the carriage moves along oppositely-moving runs of said conveyor belt, extends, at a first acute angle, in a direction of conveyor belt movement and away from said back wall proximate a trailing edge of said back wall, and a second panel, extending outwardly from a distal end of said first panel at a second angle, more acute relative to said back wall, to define a recess behind said first panel, and a roof which, when the carriage moves along said oppositely-moving runs of said conveyor belt, extends away from said back wall proximate a leading edge thereof at substantially the same acute angle as that of said second floor panel and terminates adjacent a juncture of said first and second floor panels of an immediately forwardly adjacent carriage and is received within a recess defined behind said first panel of the immediately forwardly adjacent carriage to provide, along with said second floor panel of the immediately forwardly adjacent carriage, with which said roof is coplanar, a substantially-continuous deflection surface.

2. Apparatus in accordance with claim 1 wherein said oppositely-moving runs are disposed substantially vertically.

3. Apparatus in accordance with claim 2 wherein each carriage includes side baffles extending rearwardly with respect to a direction of movement of said conveyor belt, said baffles, together with the floor of the carriage in which they are included, defining when the carriage passes from an elevating run to a return run, a chute down which granular material in a rearwardly adjacent carriage passes into the receptacle.

4. Apparatus in accordance with claim 1 wherein said conveyor belt comprises a rubber belt.

5. Apparatus in accordance with claim 4 wherein said material transporting carriages have a lateral dimension substantially the same as a lateral dimension of said rubber belt, and wherein each of said carriages is bolted to said rubber belt.

6. Apparatus in accordance with claim 5 wherein said carriages are spaced closely proximate one another along said rubber belt and are, along said elevating run and said return run, nested together.

* * * * *